(12) United States Patent
Kawakami et al.

(10) Patent No.: US 11,590,561 B2
(45) Date of Patent: Feb. 28, 2023

(54) METHOD OF PRODUCING SAND MOLD COMPRISING CURING A RESIN AND A BINDER BY THE SAME CURING AGENT

(71) Applicant: DAIHATSU MOTOR CO., LTD., Osaka (JP)

(72) Inventors: Takanobu Kawakami, Kumamoto (JP); Katsushi Morita, Aichi (JP); Akio Yamakawa, Osaka (JP); Kazuki Takada, Osaka (JP)

(73) Assignee: DAIHATSU MOTOR CO., LTD., Osaka (JP)

( * ) Notice: Subject to any disclaimer, the term of this patent is extended or adjusted under 35 U.S.C. 154(b) by 0 days.

(21) Appl. No.: 17/348,003

(22) Filed: Jun. 15, 2021

(65) Prior Publication Data

US 2021/0316356 A1  Oct. 14, 2021

Related U.S. Application Data

(62) Division of application No. 16/471,437, filed as application No. PCT/JP2018/007281 on Feb. 27, 2018, now abandoned.

(30) Foreign Application Priority Data

Feb. 28, 2017  (JP) ................................. 2017-036487

(51) Int. Cl.
  *B22C 9/02* (2006.01)
  *B22C 1/22* (2006.01)
  (Continued)

(52) U.S. Cl.
  CPC .............. *B22C 1/224* (2013.01); *B33Y 70/10* (2020.01); *C08F 34/02* (2013.01); *C08K 3/36* (2013.01)

(58) Field of Classification Search
  CPC .... B22C 9/02; B22C 1/10; B22C 1/22; B22C 1/224; B22C 3/00; B33Y 70/10;
  (Continued)

(56) References Cited

U.S. PATENT DOCUMENTS 3,838,095 A  9/1974 Johnson et al.
4,287,092 A * 9/1981 Stewart ................ B01J 31/0225
  523/144

(Continued)

FOREIGN PATENT DOCUMENTS

CN  101992260 A  3/2011
CN  102015152 A  4/2011
  (Continued)

OTHER PUBLICATIONS

JP 62-142048 (published Jun. 25, 2987) (Year: 1987).*
  (Continued)

*Primary Examiner* — Hoa (Holly) Le
(74) *Attorney, Agent, or Firm* — Edwards Neils LLC; Jean C. Edwards, Esq.

(57) ABSTRACT

A method for producing a sand mold includes mixing artificial sand with a furan resin composition including a furan resin precursor, preparing molding sand having the artificial sand and a surface-modified layer containing a resin cured product covering the artificial sand and including a curing agent attached to the surface-modified layer by mixing the curing agent including xylene sulfonic acid with the artificial sand with which the furan resin composition is mixed, and curing the furan resin composition, after mixing the artificial sand with the furan resin composition, and curing an added portion of the binder in the molding sand by adding the binder to the molding sand. In the step of curing
  (Continued)

the added portion of the binder, the curing agent for curing the furan resin composition is used also as a curing agent for curing the binder.

3 Claims, 7 Drawing Sheets

(51) Int. Cl.
*B33Y 70/10* (2020.01)
*C08F 34/02* (2006.01)
*C08K 3/36* (2006.01)

(58) Field of Classification Search
CPC ....... Y10T 428/2998; B01J 8/008; B01J 9/06; B01J 6/00
See application file for complete search history.

(56) References Cited

U.S. PATENT DOCUMENTS

| | | | |
|---|---|---|---|
| 4,713,294 A | 12/1987 | Armbruster et al. | |
| 2011/0073269 A1* | 3/2011 | Frohn | B22C 1/2253 523/144 |
| 2011/0100578 A1 | 5/2011 | Ina et al. | |
| 2014/0224152 A1 | 8/2014 | Fukuda et al. | |
| 2017/0037222 A1 | 2/2017 | Nagai et al. | |
| 2020/0188989 A1* | 6/2020 | Kawakami | C08F 34/02 |

FOREIGN PATENT DOCUMENTS

| | | | | |
|---|---|---|---|---|
| JP | 62-142048 A | 6/1987 | | |
| JP | 2006-247716 A | 9/2006 | | |
| JP | 2009-119469 A | 6/2009 | | |
| JP | 2009119469 A | 6/2009 | | |
| JP | 4336474 B2 | 9/2009 | | |
| JP | 2009-285729 A | 12/2009 | | |
| JP | 2013-240799 A | 12/2013 | | |
| WO | 2007/110091 A1 | 10/2007 | | |
| WO | WO-2016132408 A1 * | 8/2016 | ............... | B22C 1/00 |
| WO | 2016/143050 A1 | 9/2016 | | |

OTHER PUBLICATIONS

Gunther ("Additive Manufacturing of Casting Tools Using Powder-Binder-Jetting Technology", from the book: New Trends in 3D Printing, Chapter 3, 2016| DOI: 10.5772/62532). (Year: 2016).*
International Search Report Issued in PCT/JP2018/007281 dated May 15, 2018.
International Preliminary Report on Patentability issued by WIPO dated Sep. 3, 2019, in connection with International Patent Application No. PCT/JP2018/007281.
Non-Final Office Action issued in U.S. Appl. No. 16/471,437 dated Oct. 6, 2020.
Final Office Action issued in U.S. Appl. No. 16/471,437 dated Jan. 25, 2021.
Office Action, issued by the Japanese Patent Office dated Dec. 1, 2020, in connection with Japanese Patent Application No. 2017-036487.
Guidelines and examples for introducing artificial sand to cast iron factories, May 18, 2012, pp. 79-82, Japan Foundry Society, Inc.
Method for molding sand recycling and its examples, Jul. 1979, 7-8, Kobe Rikagaku Kogyo Co. Ltd.
During catalyst guide, Aug. 1979, 1-3, Kobe Rikagaku Kogyo Co. Ltd.

* cited by examiner

30

METHOD OF PRODUCING SAND MOLD COMPRISING CURING A RESIN AND A BINDER BY THE SAME CURING AGENT

CROSS-REFERENCE TO RELATED APPLICATIONS

The present application is a Divisional of U.S. patent application Ser. No. 16/471,437, filed on Jun. 19, 2019, which is a 35 U.S.C. 371 National Stage Entry of PCT/JP2018/007281, filed on Feb. 27, 2018, which claims priority from Japanese Patent Application No. 2017-036487, filed on Feb. 28, 2017, the contents of all of which are herein incorporated by reference in their entirety.

TECHNICAL FIELD

The present invention relates to a method for producing a molding sand and a molding sand.

BACKGROUND ART

To produce a product (casting) by casting, first, a mold is formed, and then a material (for example, metal, etc.) that has been melted is poured into the mold to form it into a predetermined shape.

For such a mold, a sand mold formed by adding a curing agent to the molding sand, then adding a binder, and curing the binder has been known.

For the molding sand used for the sand mold, for example, a molding sand in which a curing agent is kneaded in, a sand mixture of natural silica sand and artificial sand, has been proposed (for example, see Patent Document 1).

CITATION LIST

Patent Document

Patent Document 1: Japanese Unexamined Patent Publication No. 2013-240799

SUMMARY OF THE INVENTION

Problem to be Solved by the Invention

However, even if the binder is added to the molding sand described in Patent Document 1, the binder cannot be sufficiently cured, which may cause defective formation of a sand mold.

Thus, the present invention provides a method for producing a molding sand, and a molding sand, with which defective formation of a sand mold is suppressed.

Means for Solving the Problem

The present invention [1] includes a method for producing a molding sand, the method including the steps of: mixing artificial sand with a furan resin composition including a furan resin precursor, and mixing a curing agent with the artificial sand with which the furan resin composition is mixed, wherein the curing agent includes xylene sulfonic acid.

In this method, the artificial sand is mixed with the furan resin composition, and then the curing agent is mixed. Therefore, the furan resin composition covers the particles of the artificial sand so as to surround them, and then the furan resin composition that covers the particles of the artificial sand makes contact with the curing agent and to be cured, to form a furan resin film (layer). In this manner, a molding sand including artificial sand, and a surface-modified layer containing furan resin covering the artificial sand can be produced.

However, when the artificial sand directly makes contact with the curing agent, as in the molding sand described in Patent Document 1, the component contained in the artificial sand may reduce activity of the curing agent. In this case, even if a binder is added to the molding sand to which the curing agent is added, there are disadvantages in that the binder cannot be cured sufficiently, and defective formation of a sand mold is caused.

Meanwhile, with the above-described molding sand, the surface-modified layer containing furan resin covers the artificial sand, and therefore the contact of the curing agent with the artificial sand can be suppressed by the surface-modified layer. Therefore, reduction in activities of the curing agent by the component contained in the artificial sand can be suppressed.

As a result, in the above-described molding sand, the binder can be reliably cured when the binder is added, and defective formation of a sand mold can be suppressed.

Forming of a sand mold by 3-dimensional additive manufacturing method (that is, 3D printer) has also been examined. In 3-dimensional additive manufacturing, a sand mold is formed by repeating a step of forming layers of molding sand, and adding a binder to the molding sand layer to solidify the portion of the molding sand layer where the binder is added.

Therefore, flowability that allows for precise formation of layers, and for addition of the molding sand layers is required for the molding sand.

However, when the molding sand is produced by using a curing agent including p-toluenesulfonic acid, the molding sand has high flowability, and the molding sand cannot be formed stably into layers. Thus, addition of linoleic acid as a superplasticizer to the molding sand to adjust the flowability of the molding sand is examined. However, when a superplasticizer is added to the molding sand, the superplasticizer has to be removed when the molding sand is recycled, and recyclability of the molding sand is reduced.

Meanwhile, in the above-described method for producing a molding sand, the molding sand is produced by using the curing agent including xylene sulfonic acid. Such a molding sand has suitable flowability for 3-dimensional additive manufacturing without addition of the superplasticizer, and allows for precise formation of layers, and the layers of the molding sand can be added.

Thus, with the present invention, a molding sand that allows for suppression of defective formation of a sand mold and can be suitably used for 3-dimensional additive manufacturing can be produced.

The present invention [2] includes the method for producing molding sand described in [1] above, wherein in the step of mixing the artificial sand with the furan resin composition, the temperature is 100° C. or less.

With this method, the artificial sand is mixed with the furan resin composition at 100° C. or less, and therefore the furan resin composition can cover the artificial sand stably. Therefore, a molding sand having suitable flowability for 3-dimensional additive manufacturing can be produced. Furthermore, production costs can be reduced compared with the case where artificial sand is mixed with furan resin composition at a temperature of more than 100° C.

The present invention [3] includes the method for producing a molding sand described in [1] or [2] above, wherein 0.3 parts by mass or more and 3 parts by mass or less of xylene sulfonic acid is mixed relative to 1 part by mass of the furan resin precursor.

With this method, xylene sulfonic acid is blended in the above-described range, and therefore molding sand having suitable flowability for 3-dimensional additive manufacturing can be produced even more stably, and strength of the sand mold formed from the molding sand can be improved.

The present invention [4] includes a molding sand including an artificial sand, a surface-modified layer containing furan resin covering the artificial sand, and a curing agent layer attached to the surface-modified layer, wherein the curing agent layer includes xylene sulfonic acid.

With this configuration, defective formation of a sand mold can be suppressed, and the molding sand can be suitably used for 3-dimensional additive manufacturing.

Effects of the Invention

With the method for producing a molding sand of the present invention, a molding sand that can suppress defective formation of a sand mold can be produced. With the molding sand of the present invention, defective formation of a sand mold can be suppressed.

DESCRIPTION OF THE EMBODIMENTS

<Method for Producing Molding Sand>

Figure 1:
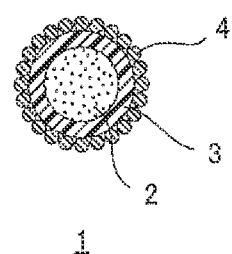
FIG. 1 is a schematic diagram illustrating the configuration of the molding sand produced in an embodiment of the present invention.

The method for producing a molding sand of the present invention includes a step of mixing artificial sand with a furan resin composition (resin mixing step), and a step of mixing a curing agent with the artificial sand with which the furan resin composition was mixed (curing agent mixing step).

1. Resin Mixing Step

In the resin mixing step, the artificial sand is mixed with a furan resin composition. Therefore, first, the artificial sand and the furan resin composition are prepared.

(1-1) Artificial Sand

The artificial sand is an aggregation of a plurality of particles, and is produced by a known method (for example, sintering method, fusion method, flame fusion method, etc.).

For the artificial sand, for example, aluminium oxide (alumina sand), mullite sand, and mullite-zircon sand are used. The artificial sand can be used singly, or can be used in combination of two or more. Of these artificial sand, preferably, mullite sand is used.

The mullite sand is mainly composed of a mixed composition compound (aluminosilicate) of aluminium oxide (alumina) and silicon dioxide (silica).

The aluminium oxide content relative to the total amount of the mullite sand is, for example, 50 mass % or more, preferably 60 mass % or more, more preferably 65 mass % or more, and for example, 90 mass % or less, preferably 80 mass % or less.

The silicon dioxide content relative to the total amount of the mullite sand is, for example, 5 mass % or more, preferably 15 mass % or more, and for example, 45 mass % or less, preferably 40 mass % or less, more preferably 30 mass % or less.

Such a mullite sand can be prepared by, for example, the method described in Japanese Unexamined Patent Publication No. S61-63333, and the method described in Japanese Unexamined Patent Publication No. 2003-251434.

For the mullite sand, a commercially available product can be used, and for a commercially available product of the mullite sand, for example, ESPEARL (manufactured by YAMAKAWA SANGYO CO., LTD.), and CERABEADS (manufactured by ITOCHU CERATECH CORPORATION) are used.

The artificial sand includes particles having a nominal size of 53 µm (281 mesh) or more and 150 µm (100 mesh) or less (hereinafter referred to as 53-150 µm particles), and as necessary, can include particles having a nominal size of (281 mesh) less than 53 µm (hereinafter referred to as PAN), and particles having a nominal size of more than 150 µm (100 mesh)(hereinafter referred to as more than 150 µm particles).

The 53-150 µm particles content relative to the total amount of the artificial sand is, for example, 20 mass % or more, preferably 99.0 mass % or more, and for example, 100 mass % or less.

When the 53-150 µm particles content is within the above-described range, the surface roughness of the sand mold can be decreased, and a molding sand having suitable flowability for 3-dimensional additive manufacturing can be reliably produced.

When the artificial sand includes PAN, the PAN content relative to the total amount of the sand is, for example, more than 0 mass %, and for example, 10 mass % or less, preferably 0.5 mass % or less.

When the artificial sand includes more than 150 µm particles, the more than 150 µm particles content relative to the total amount of the sand is, for example, more than 0 mass %, and for example, 10 mass % or less, preferably 0.5 mass % or less.

The artificial sand may include feldspar. The feldspar is aluminosilicate containing alkali metal and/or alkali earth metal.

For the feldspar, for example, potash feldspar ($K_2O \cdot Al_2O_3 \cdot 6SiO_2$) and sodium feldspar ($Na_2O \cdot Al_2O_3 \cdot 6SiO_2$) are used.

The feldspar content relative to the total amount of the artificial sand is, for example, more than 0 mass %, and for example, 10 mass % or less, preferably 5 mass % or less.

To the artificial sand, for example, natural silica sand can also be added. When natural silica sand is added, the natural silica sand is added in an amount relative to 100 parts by mass of the artificial sand of, for example, more than 0 part by mass and 80 parts by mass or less.

(1-2) Furan Resin Composition

The furan resin composition is a curable resin composition that turns to furan resin when cured, and be in a state of completely cured (C stage) in the presence of acid at, for example, 35° C. or more and less than 150° C.

The furan resin composition contains a furan resin precursor.

For the furan resin precursor, for example, furfuryl alcohol and furan resin prepolymer are used.

For the furan resin prepolymer, for example, a homopolymer of furfuryl alcohol, a copolymer of furfuryl alcohol and aldehyde compound, a copolymer of furfuryl alcohol, urea, and aldehyde compound (urea-modified furan resin prepolymer), and a copolymer of furfuryl alcohol and furfural are used. The furan resin prepolymer can be used singly, or can be used in combination of two or more.

Of these furan resin prepolymers, preferably, a copolymer of furfuryl alcohol, urea, and aldehyde compound (urea-modified furan resin prepolymer) is used. For the aldehyde compound as a monomer of urea-modified furan resin prepolymer, for example, formaldehyde, acetaldehyde, glyoxal, and paraformaldehyde are used, and preferably, paraformaldehyde is used.

For these furan resin precursors, one of furfuryl alcohol and furan resin prepolymer can be used singly, but preferably, furfuryl alcohol and furan resin prepolymer are used in combination.

The furan resin precursor content relative to the total amount of the furan resin composition is, for example, 10 mass % or more, preferably 50 mass % or more, more preferably 60 mass % or more, particularly preferably 90 mass % or more, and for example, 95 mass % or less.

When the furan resin composition contains furfuryl alcohol and furan resin prepolymer, the furan resin prepolymer content relative to 100 parts by mass of the furfuryl alcohol is, for example, 1 part by mass or more, preferably 100 parts by mass or more, and for example, 300 parts by mass or less, preferably 150 parts by mass.

The furan resin composition can contain, in addition to the above-described components, a solvent and a cross-linking agent, and also as necessary, a curing accelerator.

Examples of the solvent include water, acetone, ethyl acetate, and alcohol, and preferably, water is used.

The solvent content relative to the total amount of the furan resin composition is, for example, 0.01 mass % or more, preferably 1 mass % or more, and for example, 50 mass % or less, preferably 10 mass % or less.

Examples of the cross-linking agent include silane.

The cross-linking agent content relative to the total amount of the furan resin composition is, for example, 0.01 mass % or more, preferably 0.5 mass % or more, and for example, 20 mass % or less, preferably 3 mass % or less.

Examples of the curing accelerator include resorcin, cresol, hydroquinone, phloroglucinol, methylenebisphenol, and bishydroxymethylfuran.

(1-3) Mixing Conditions

To mix the artificial sand with furan resin composition, first, the artificial sand is preheated to a predetermined temperature (mixing temperature), and then the furan resin composition is added to the artificial sand. Thereafter, the artificial sand is stirred and mixed with furan resin composition until the mixture is homogenous while keeping the mixing temperature.

This step is carried out by, for example, a known mixer. The mixer includes, for example, a mixing vessel, a rotatable mixing blade disposed in the mixing vessel, and a heater that can heat inside the mixing vessel.

The furan resin composition is mixed in an amount relative to 100 parts by mass of the artificial sand of, for example, 0.005 parts by mass or more, preferably 0.10 parts by mass or more, more preferably 0.15 parts by mass or more, particularly preferably 0.20 parts by mass or more, and for example, 3 parts by mass or less, preferably 0.50 parts by mass or less, more preferably 0.30 parts by mass or less.

When the furan resin composition is mixed in an amount of the above-described lower limit or more, the artificial sand can be covered by furan resin more reliably. When the furan resin composition is mixed in an amount of the above-described upper limit or less, the amount of water produced in the polymerization reaction of the furan resin precursor (described later) can be decreased, and therefore excessive increase of the viscosity of the molding sand can be suppressed, and the strength of the sand mold can be improved.

The mixing temperature is, for example, 0° C. or more, preferably 35° C. or more, preferably 70° C. or more, and for example, 150° C. or less, preferably 100° C. or less, more preferably 90° C. or less, particularly preferably 80° C. or less.

When the mixing temperature is the above-described lower limit or more, water produced in the polymerization reaction of the furan resin precursor (described later) can be stably removed. Therefore, the water content in the molding sand can be reduced, and therefore excessive increase in the viscosity of the molding sand can be suppressed.

In particular, when the mixing temperature is 70° C. or more, water can be reliably removed, and in the resin mixing step, a portion of the furan resin composition covers the artificial sand so as to surround them, and then goes through thermosetting. Therefore, contact between the curing agent and the artificial sand can be suppressed even more in the curing agent mixing step, and therefore decrease in activities of the curing agent can be reliably suppressed, and the strength of the sand mold can be improved.

When the mixing temperature is the above-described upper limit or less, excessive increase in the curing speed of the furan resin composition can be suppressed, and the furan resin composition can stably cover the artificial sand. When the mixing temperature is more than the above-described upper limit, the furan resin composition may be cured without sufficiently covering the artificial sand. In this case, the shape of the molding sand will be deformed, and the flowability of the molding sand may decrease excessively.

Meanwhile, when the mixing temperature is the above-described upper limit or less, the furan resin composition can stably cover the artificial sand, and therefore excessive decrease in the flowability of the molding sand can be suppressed. The mixing temperature is the above-described upper limit or less, and therefore production costs can be reduced.

The mixing time in the resin mixing step is, when the mixing object (mixture of artificial sand and resin composition) is 1 kg, for example, 1 second or more, preferably 3 seconds or more, and for example, 20 seconds or less, preferably 10 seconds or less. The mixing time is, when the mixing object is Nkg, N times of the above-described seconds.

In this manner, the furan resin composition covers the artificial sand so as to surround their particles.

2. Curing Agent Mixing Step

Then, in the curing agent mixing step, a curing agent is mixed with the artificial sand with which the furan resin composition is mixed.

(2-1) Curing Agent

The curing agent is an acid catalyst that cures (completely cured state) the furan resin precursor. The curing agent contains, as an acid component, xylene sulfonic acid, and preferably, only contains xylene sulfonic acid as the acid component.

For the xylene sulfonic acid, orthoxylene sulfonic acid (2,3-dimethylbenzenesulfonic acid, 3,4-dimethylbenzenesulfonic acid), metaxylene sulfonic acid (2,4-dimethylbenzenesulfonic acid, 3,5-dimethylbenzenesulfonic acid, 2,6-dimethylbenzenesulfonic acid), and paraxylene sulfonic acid (2,5-dimethylbenzenesulfonic acid) are used. These xylene sulfonic acids may be used singly or in a combination of two or more.

The xylene sulfonic acid content relative to the total amount of the curing agent is, for example, 90.0 mass % or more, preferably 95.0 mass % or more, and for example, 100 mass % or less, preferably 97.0 mass % or less.

To the curing agent, as necessary, known additives can be added. The curing agent may contain residues from the curing agent production processes.

(2-1) Mixing Conditions

Then, while keeping the temperature to the above-described mixing temperature range, the curing agent is added to the artificial sand with which the furan resin composition is mixed, and the mixture is stirred. Thereafter, the mixture is stirred and mixed until the artificial sand to which the curing agent is added smoothly flows.

This step can be carried out in the same mixer in the above-described resin mixing step, or can be carried out in a different mixer from the above-described resin mixing step, transferring the artificial sand with which the furan resin composition is mixed.

The mixing ratio of the curing agent relative to 100 parts by mass of the artificial sand is, for example, 0.005 parts by mass or more, preferably 0.05 parts by mass or more, more preferably 0.15 parts by mass or more, particularly preferably 0.20 parts by mass or more, and for example, 3 parts by mass or less, preferably 0.50 parts by mass or less, more preferably 0.30 parts by mass or less.

When the mixing ratio of the curing agent is the above-described lower limit or more, the furan resin composition that covers the artificial sand can be reliably cured. When the mixing ratio of the curing agent is the above-described upper limit or less, excessive increase in the viscosity of the molding sand can be suppressed.

The mixing ratio of xylene sulfonic acid in the curing agent relative to 1 part by mass of the furan resin precursor in the furan resin composition is, for example, 0.1 parts by mass or more, preferably 0.3 parts by mass or more, more preferably 0.8 parts by mass or more, and for example, 3 parts by mass or less, preferably 2 parts by mass or less, more preferably 1.2 parts by mass or less.

When the mixing ratio of xylene sulfonic acid is within the above-described range, strength of the sand mold made by the molding sand can be improved.

The mixing temperature range in the curing agent mixing step is the same as the mixing temperature range in the above-described resin mixing step, and the mixing time range in the curing agent mixing step is the same as the mixing time range in the above-described resin mixing step.

In the curing agent mixing step, the furan resin composition that covers the artificial sand makes contact with xylene sulfonic acid to be cured, to form a furan resin film (layer), a cured product. At this time, xylene sulfonic acid works as a catalyst.

In this manner, a surface-modified layer containing the furan resin (furan resin film) covering the artificial sand is formed.

To be specific, when the furan resin composition contains furfuryl alcohol, as shown in the formula (1) below, furfuryl alcohol goes through condensation polymerization and forms furan resin by making contact with xylene sulfonic acid (HA in formula).

[Chem. 1]

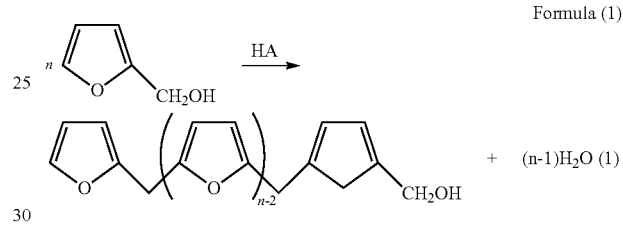

Formula (1)

As shown in the above-described formula (1), water is produced in condensation polymerization of furfuryl alcohol.

A portion of water produced by the reaction oozes out to the surface of the surface-modified layer, and then removed by evaporation. At this time, the curing agent (xylene sulfonic acid) is pushed to the surface of the surface-modified layer along with water. This allows the curing agent to attach to the surface of the surface-modified layer to form the curing agent layer.

The water that did not ooze out to the surface of the surface-modified layer is, for example, embraced in the furan resin, or when the artificial sand contains potash feldspar or sodium feldspar, as shown in formula (2) and formula (3) below, water is removed by reacting with potash feldspar and sodium feldspar.

Formula (2):

[Chem. 2]

 (2)

Formula (3):

[Chem. 3]

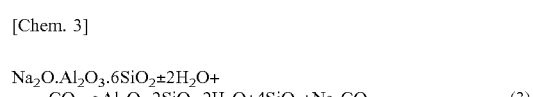 (3)

3. Molding Sand

Molding sand is produced in the above-described manner. The molding sand is an aggregation of a plurality of particles, but in FIG. 1, for convenience, one particle of the molding sand is shown as the molding sand 1.

The molding sand 1 includes an artificial sand 2, a surface-modified layer containing furan resin 3 covering the artificial sand 2, and a curing agent layer 4 attached to the surface-modified layer, and preferably, consists of them.

The artificial sand 2 is the particles of the above-described artificial sand.

The furan resin contained in the surface-modified layer 3 is a completely cured product of the furan resin composition, and the curing reaction is completed, and for example, the curing reaction does not progress further even it is heated.

The surface-modified layer 3 has thickness of, for example, 0.01 µm or more, preferably 0.1 µm or more, and for example, 10 µm or less, preferably 1 µm or less.

The surface-modified layer 3 may contain a component other than the furan resin, for example, an uncured furan resin precursor, but the furan resin content relative to the surface-modified layer 3 is, for example, 80 mass % or more, preferably 90 mass % or more, and for example, 100 mass % or less.

The curing agent layer 4 is disposed at the surface of the surface-modified layer 3. The curing agent layer 4 contains xylene sulfonic acid, and preferably, consists of xylene sulfonic acid.

4. Method for Forming Sand Mold (Production Method)

(4-1) 3D Printer

Such a molding sand 1 can be used in manufacturing of various sand molds, but particularly useful for 3-dimensional additive manufacturing, that is, for molding sand for a 3D printer.

Figure 6A:
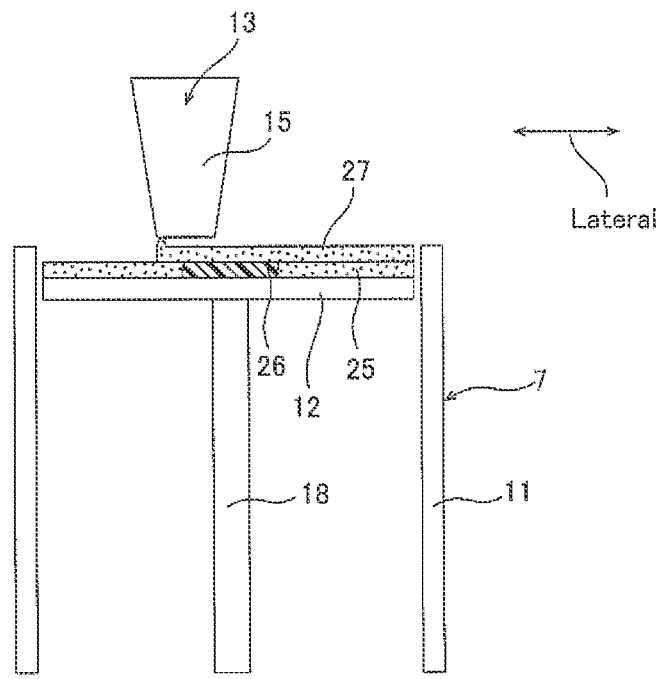
FIG. 6A shows, following FIG. 5B, a step of forming a second molding sand layer on the first molding sand layer.
Figure 6B:
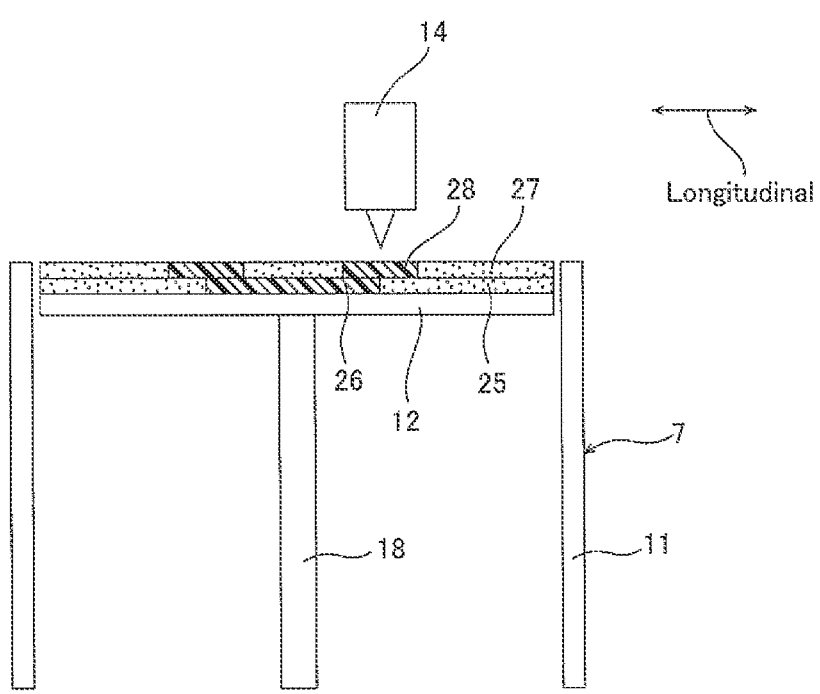
FIG. 6B shows, following FIG. 6A, a step of adding the binder to the second molding sand layer.
Figure 7A:
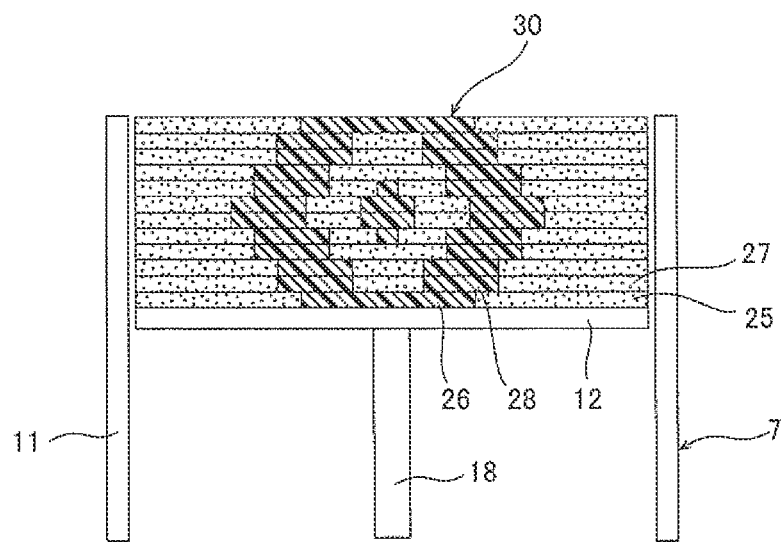
FIG. 7A shows, following FIG. 6B, a step of forming a sand mold by repeating sequentially the molding sand layer formation and binder addition.
Figure 7B:
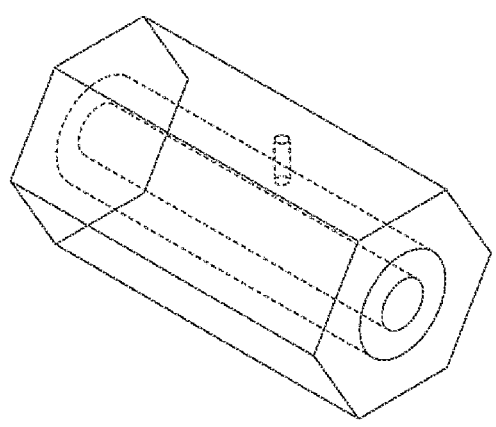
FIG. 7B is a perspective view of the sand mold shown in FIG. 7A.

For example, the molding sand 1 is made, as shown in FIG. 2 to FIG. 7B, into a sand mold 30 (ref: FIG. 7B) by a 3D printer (3-dimensional additive manufacturing devise) 6.

Figure 2:
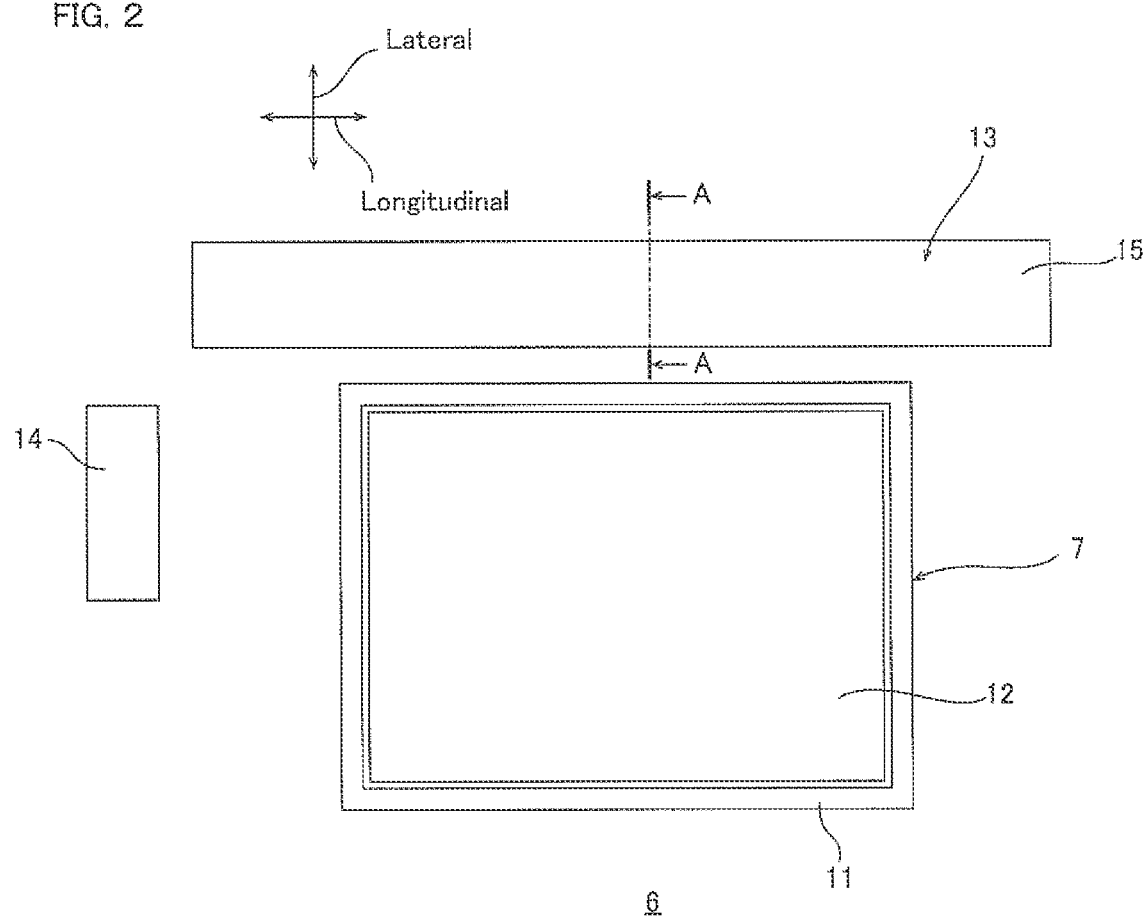
FIG. 2 is a plan view of an embodiment of the 3D printer, in which the molding sand shown in FIG. 1 can be used.

As shown in FIG. 2, the 3D printer 6 is a device that allows making of a sand mold from 3D-CAD data, and includes a manufacturing unit 7, a recoater 13, a jet head 14, and an operation unit, which is not shown.

Figure 4A:
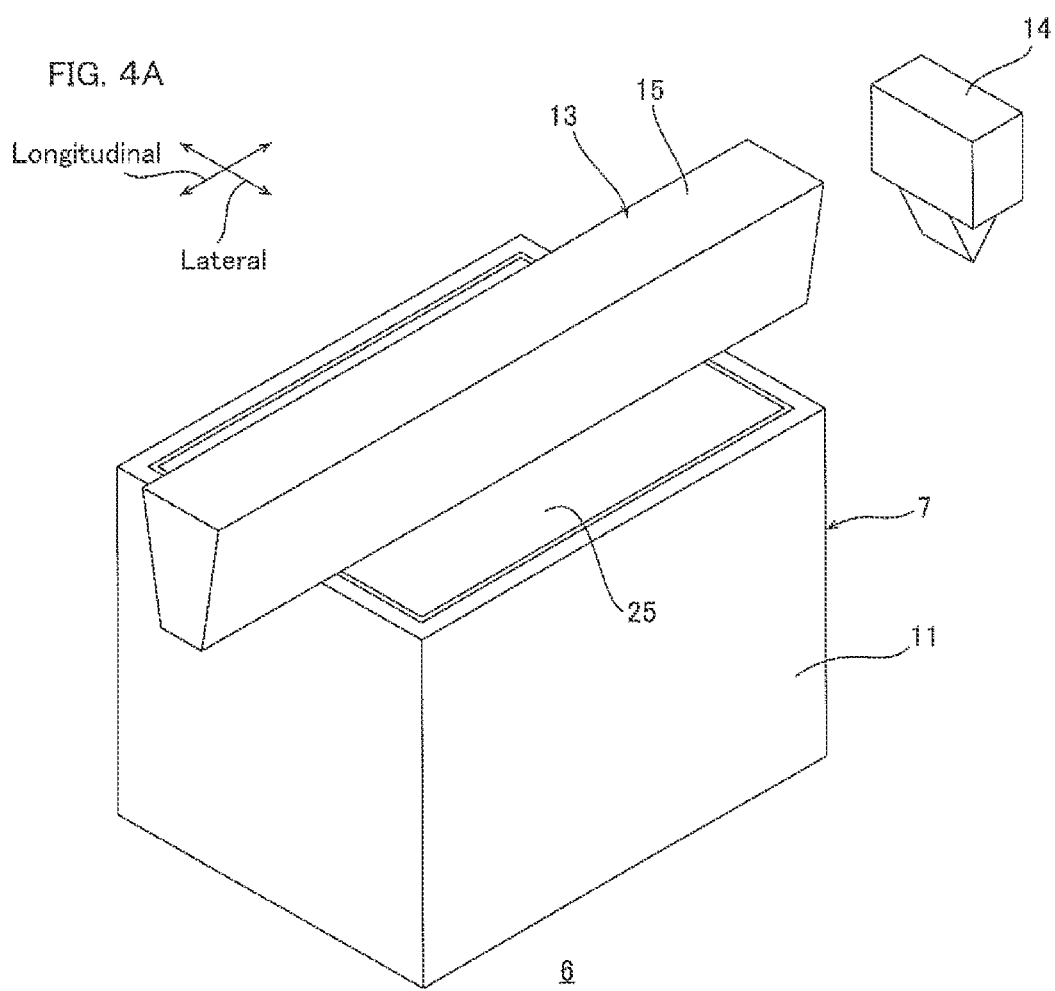
FIG. 4A is a perspective view of the 3D printer as shown in FIG. 2, showing a step of forming a first molding sand layer by the recoater.
Figure 4B:
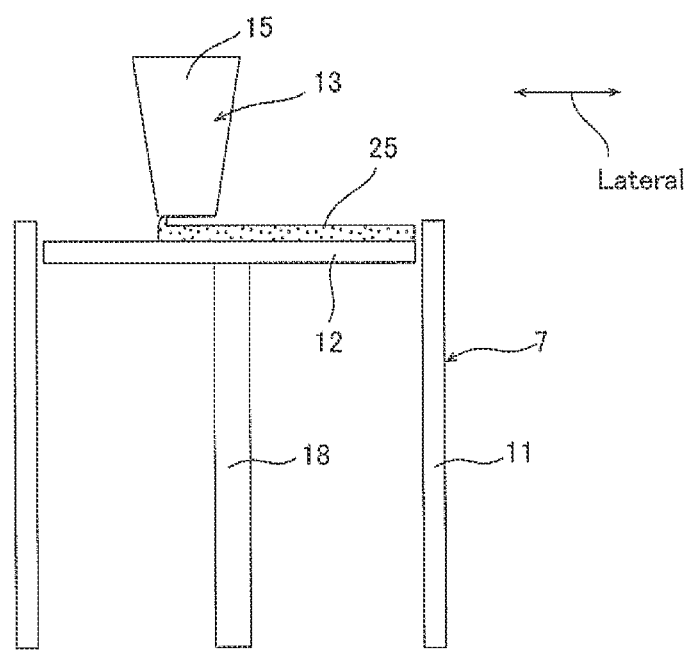
FIG. 4B illustrates the step shown in FIG. 4A.

As shown in FIG. 4A and FIG. 4B, the manufacturing unit 7 includes a job box 11, a stage 12, and a support axis 18.

The job box 11 has a substantially rectangular shape in plan view, and extends in up-down direction. The upper end portion of the job box 11 is open.

The stage 12 is a substantially rectangle plate in plan view, and is disposed in the job box 11. The stage 12 is fixed at the upper end portion of the support axis 18 that is capable of ascending and descending in up-down direction.

The stage 12 is movable in up-down direction in the job box 11 by ascending and descending of the support axis 18.

The recoater 13 is configured to be capable of storing the molding sand, and capable of supplying the stored molding sand to the stage 12. The recoater 13 is capable of moving in surface direction of the stage 12 so as to pass through with a space provided above the stage 12 in parallel with the stage 12.

In the following, the direction that the recoater 13 can move is referred to as lateral direction (X direction), and the direction orthogonal to both of the lateral direction and the up-down direction is referred to as longitudinal direction (Y direction).

Figure 3:
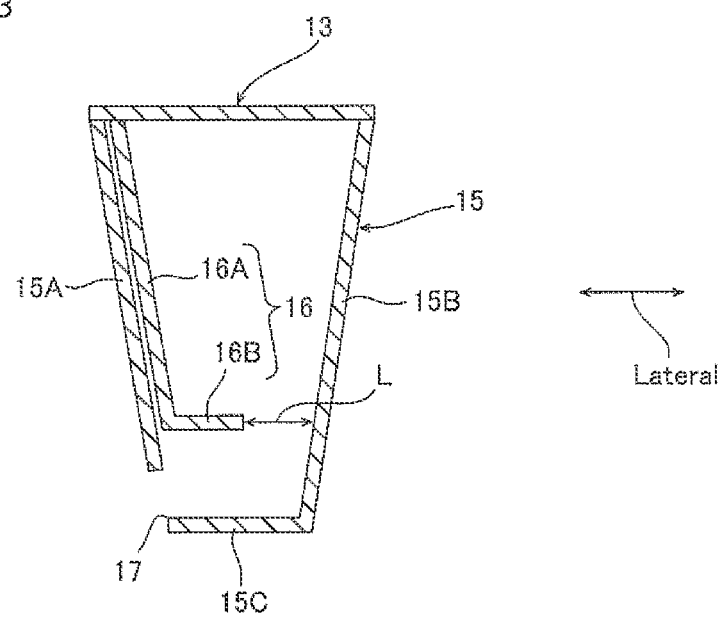
FIG. 3 is a cross sectional view taken along line A-A of the recoater shown in FIG. 2.

As shown in FIG. 3, the recoater 13 includes a vessel 15 and a blade 16.

The vessel 15 can store the above-described molding sand. The vessel 15 extends in the longitudinal direction (ref: FIG. 2). The vessel 15 has a first wall 15A and a second wall 15B that are disposed with a space provided therebetween in the lateral direction, and a bottom wall 15C positioned at the lower end of the vessel 15, and an opening 17 that allows communication inside out of the vessel 15. The opening 17 is formed at a lower end portion of the first wall 15A, and is defined between the first wall 15A and the bottom wall 15C. The opening 17 extends in the longitudinal direction. The opening 17 has a size in the longitudinal direction that is substantially the same as the size in the longitudinal direction of the stage 12.

The blade 16 is disposed in the vessel 15. The blade 16 can vibrate so as to discharge the molding sand stored in the vessel 15 from the opening 17. The blade 16 has a letter L shape when seen from a side, and has a plate 16A and a projection 16B.

The plate 16A is disposed to be spaced apart from the first wall 15A along the first wall 15A.

The projection 16B projects from the lower end portion of the plate 16A towards the second wall 15B. The free end portion of the projection 16B (end portion opposite to the plate 16A) is disposed in spaced apart relation from the second wall 15B in the lateral direction. The length L in the lateral direction between the free end portion of the projection 16B and the second wall 15B is, for example, 0.3 mm or more, preferably 0.7 mm or more, and for example, 6.0 mm or less, preferably 1.5 mm or less.

The recoater 13 is connected to a molding sand tank, which is not shown, to which the molding sand is stored, and the molding sand is supplied from the molding sand tank when the amount of the molding sand stored in the vessel 15 is a predetermined value or less.

Figure 5A:
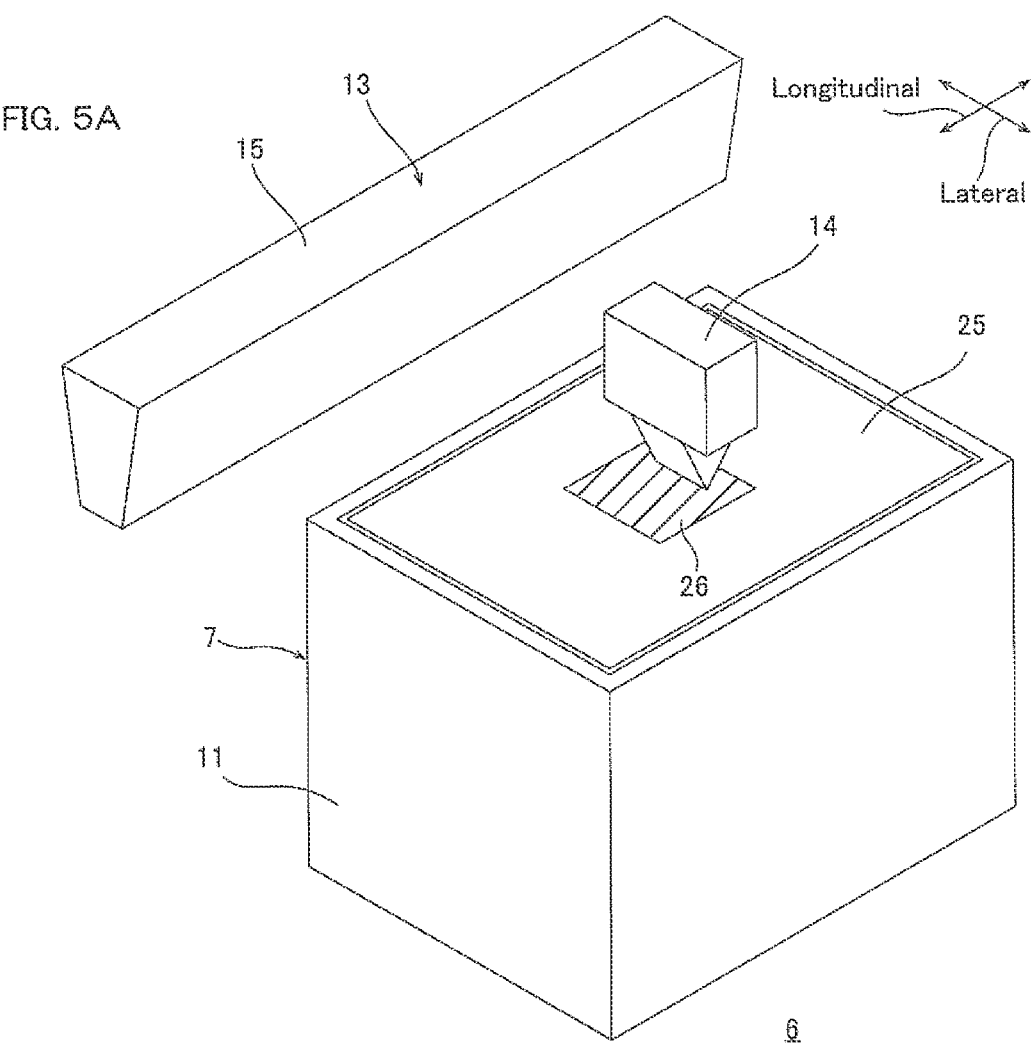
FIG. 5A is a perspective view of the 3D printer shown in FIG. 2, showing a step of adding a binder to the first molding sand layer with a jet head.
Figure 5B:
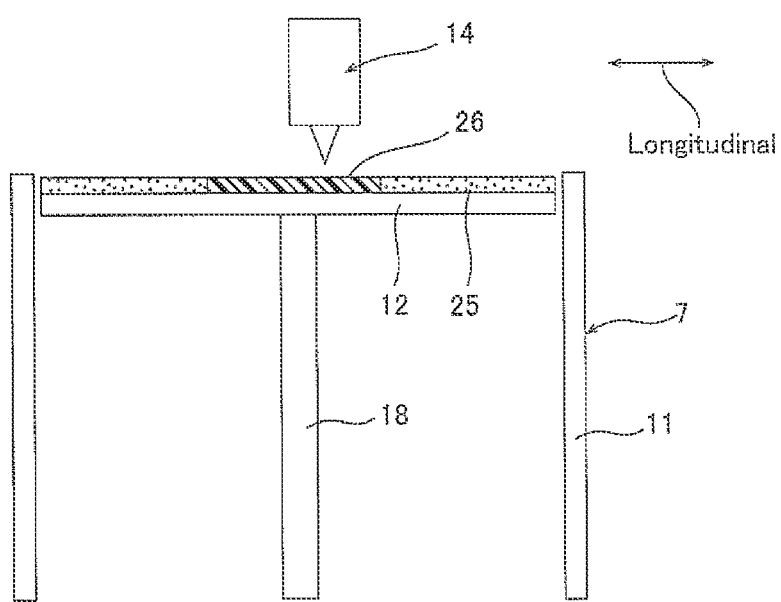
FIG. 5B illustrates the step shown in FIG. 5A.

As shown in FIG. 5A and FIG. 5B, the jet head 14 is configured to feed a binder to be described later to the molding sand layer formed on the stage 12. The jet head 14 is connected to the binder tank, which is not shown, that stores the binder, and the binder is supplied from the binder tank.

The jet head 14 is electrically connected with the operation unit, which is not shown. The jet head 14 is movable in the longitudinal direction and lateral direction so as to pass above the stage 12 with a space provided therebetween to be in parallel with the stage 12.

Examples of the binder to be fed by the jet head 14 include the above-described furan resin compositions. That is, the binder contains the furan resin precursor. For the furan resin precursor contained in the binder, preferably, furfuryl alcohol is used, even more preferably, furfuryl alcohol is used singly.

The furan resin precursor content relative to the total amount of the binder is, for example, 1 mass % or more, preferably 10 mass % or more, more preferably 85 mass % or more, and for example, 100 mass % or less, preferably 95 mass % or less.

The binder can contain, in addition to the above-described furan resin precursor, for example, the above-described curing accelerator. For the curing accelerator, preferably, resorcin is used. The curing accelerator content relative to the total amount of the binder is, for example, 1 mass % or more, preferably 5 mass % or more, and for example, 30 mass % or less, preferably 15 mass % or less.

(4-2) Making of Sand Mold with 3D Printer

In the 3D printer 6, as shown in FIG. 4A and FIG. 4B, first, the recoater 13 in which the molding sand is stored moves in lateral direction, and the blade 16 vibrates a little, to discharge the molding sand from the opening 17 on the stage 12 to form a layer (ref: FIG. 3).

In this manner, the first molding sand layer 25 (molding sand layer) is formed on the stage 12. That is, the molding sand is formed into a layer on the stage 12 without addition of the superplasticizer.

The thickness of the first molding sand layer 25 is larger than the particle size of the largest particle included in the molding sand, and is, for example, 200 μm or more, preferably 250 μm or more, and for example, 400 μm or less, preferably 300 μm or less.

Then, as shown in FIG. 5A and FIG. 5B, the jet head 14 adds the binder to the portion of the first molding sand layer 25 to be the sand mold based on 3D-CAD data input from the operation unit, which is not shown, to form a first added portion 26.

In the first added portion 26, the added binder makes contact with the curing agent (xylene sulfonic acid) attached to the surface-modified layer of the molding sand and curing is caused, allowing the particles of molding sand to adhere to each other. In this manner, the first added portion 26 is solidified by the binder cured product. That is, the curing agent that cures the furan resin composition also works as the curing agent that cures the binder.

Then, as shown in FIG. 6A, the stage 12 descends to a degree of the thickness of the first molding sand layer 25, and the recoater 13 discharges the molding sand again on the first molding sand layer 25 to form a layer to form a second molding sand layer 27 (molding sand layer). Thereafter, as shown in FIG. 6B, the jet head 14 adds the binder to a portion of the second molding sand layer 27 to be the sand mold, to form a second added portion 28.

Similarly, as shown in FIG. 7A, the molding sand layer formation by the recoater 13, and addition of the binder by the jet head 14 are repeated in sequence. When the molding sand layer formation is repeated n times, the first molding sand layer 25 to n-th molding sand layer are sequentially laminated, and the first added portion 26 to the n-th added portion are formed sequentially. The thickness range of each of the molding sand layer is the same as the thickness range of the above-described first molding sand layer 25.

Thereafter, as shown in FIG. 7B, the portion where the binder is not added in the molding sand layer is removed.

The sand mold 30 is produced in this manner. The sand mold 30 contains the molding sand, and the binder cured product that allows the molding sand to adhere to each other. In FIG. 6B and FIG. 7A, for convenience, the surface of the sand mold 30 is shown as having uneven surface, but actually, the surface of the sand mold 30 is formed to be substantially smooth, as shown in FIG. 7B.

5. Operations and Effects

In the above-described method for producing molding sand, the curing agent is mixed after mixing the artificial sand with the furan resin composition. Therefore, the furan resin composition covers the artificial sand so as to surround the particles thereof, and then the furan resin composition covering the particles of the artificial sand makes contact with the curing agent to be a furan resin film (layer).

In this manner, as shown in FIG. 1, the molding sand 1 including the artificial sand 2, and the surface-modified layer 3 containing the furan resin covering the artificial sand 2 is produced.

In the molding sand 1, the surface-modified layer 3 containing furan resin covers the artificial sand 2, and therefore contact between the curing agent and the artificial sand 2 can be suppressed by the surface-modified layer 3.

However, when the curing agent makes contact with the artificial sand, the component contained in the artificial sand may reduce activities of the curing agent.

For example, when the artificial sand contains potash feldspar, as shown in the above-described formula (2), potash feldspar reacts with water to produce potassium carbonate.

Then, potassium carbonate reacts with, as shown in the formula (4) below, xylene sulfonic acid (HA).

Formula (4):

[Chem. 4]

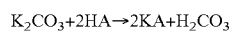  (4)

In this manner, xylene sulfonic acid (HA) in the curing agent is converted to weak acid (KA), which reduces activities of the curing agent.

Carbonic acid produced by reaction of potassium carbonate and xylene sulfonic acid is decomposed into water and carbon dioxide, as shown in the formula (5) below.

Formula (5):

[Chem. 5]

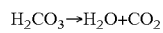  (5)

Meanwhile, in the molding sand 1, the contact between the curing agent and the artificial sand 2 is suppressed by the surface-modified layer 3, and therefore reduction in activities of the curing agent can be suppressed. Therefore, when the binder is added to the molding sand 1, the binder can be reliably cured, and defective formation of the sand mold 30 can be suppressed.

The above-described molding sand has suitable flowability for 3-dimensional additive manufacturing. Therefore, as shown in FIG. 2 to FIG. 7B, the molding sand can be formed into layers precisely in the 3-dimensional additive manufacturing method (3D printer) without adding the superplasticizer to the molding sand, and the layers of the molding sand can be laminated.

In the 3-dimensional additive manufacturing method (3D printer), as shown in FIG. 7A and FIG. 7B, after the sand mold 30 is made, the molding sand where the binder is not added is removed. The molding sand where the binder is not added has no superplasticizer added, and therefore they can be collected as is (without any treatment) and reused. Thus, recyclability of the molding sand can be improved. When the superplasticizer is added to the molding sand, and the molding sand to which the superplasticizer is added is reused as is, the superplasticizer deteriorates, and in the 3-dimensional additive manufacturing method (3D printer), the molding sand may not be able to form precisely into layers.

In the resin mixing step, preferably, the artificial sand and the furan resin composition are mixed at 100° C. or less. Therefore, the furan resin composition can stably cover the artificial sand. As a result, excessive reduction in the flowability of the molding sand can be suppressed, and the molding sand having suitable flowability for the 3-dimensional additive manufacturing can be produced stably. Compared with the case where the artificial sand is mixed with the furan resin composition at the temperature of more than 100° C., production costs can be reduced.

In the resin mixing step, preferably, the mixing ratio of the xylene sulfonic acid relative to 1 part by mass of the furan resin precursor is 0.3 parts by mass or more and 3 parts by mass or less. Therefore, molding sand having suitable flowability for 3-dimensional additive manufacturing can be produced stably, and strength of the sand mold produced with the molding sand can be improved.

6. Modified Example

In the embodiment above, the artificial sand is preheated and then the furan resin composition is added in the resin mixing step, but the present invention is not limited thereto. The temperature can be adjusted to a temperature in the above-described mixing temperature range after mixing the artificial sand with the furan resin composition. This also achieves the above-described operations and effects.

EXAMPLES

The present invention is further described in detail based on EXAMPLES below. However, the present invention is not limited to Examples. The specific numerical values in blending ratio (content ratio), physical property value, and parameter used in the following description can be replaced with upper limit values (numerical values defined with "or less" or "below") or lower limit values (numerical values defined with "or more" or "above") of corresponding numerical values in blending ratio (content ratio), physical property value, and parameter described in the above-described "DESCRIPTION OF EMBODIMENTS".

Examples 1 to 6

An artificial sand A (mullite sand, trade name: ESPEARL #100DAM, manufactured by YAMAKAWA SANGYO CO., LTD.) and the furan resin composition (resin composition) shown in Table 1 were prepared. The artificial sand A contained potash feldspar and sodium feldspar. The artificial sand A had an AFS (fineness number) of 106.4.

Then, 100 parts by mass of the artificial sand A was preheated to a mixing temperature shown in Table 2, and then the furan resin composition was added to the formulation shown in Table 2. The artificial sand A and the furan resin composition were mixed until the mixture was homogenous (resin mixing step).

Thereafter, a curing agent A containing xylene sulfonic acid (XS) was added to the artificial sand A in which the furan resin composition was mixed in accordance with the formulation shown in Table 2, and the artificial sand A to which the curing agent A was added was stirred and mixed until the mixture smoothly flowed (curing agent mixing step).

The curing agent A contained xylene sulfonic acid. The xylene sulfonic acid concentration relative to the total amount of the curing agent was 95.0 mass % or more and 97.0 mass % or less. In the curing agent mixing step, the temperature was set to a temperature in the temperature range +5 to 10° C. of the mixing temperature shown in Table 2.

In this manner, a molding sand including the artificial sand A, surface-modified layer containing furan resin covering the artificial sand A, and curing agent A attached to the surface-modified layer was produced.

Example 7

A molding sand was produced in the same manner as in Example 2 except that the artificial sand A was changed to artificial sand B (mullite sand, trade name: CERABEADS #1450, manufactured by ITOCHU CERATECH CORPORATION). The artificial sand B contained potash feldspar and sodium feldspar. The artificial sand B had an AFS fineness number of 108.8.

Comparative Example 1

A molding sand was produced in the same manner as in Example 2, except that the curing agent A was changed to a curing agent B containing p-toluenesulfonic acid (PTS). The curing agent B contained p-toluenesulfonic acid, sulfuric acid, and water. The p-toluenesulfonic acid concentration relative to the total amount of the curing agent B was 63 mass %, and the sulfuric acid concentration relative to the total amount of the curing agent B was 1.0 mass %.

Comparative Example 2

A molding sand was produced in the same manner as in Example 7, except that the curing agent A was changed to the curing agent B containing p-toluenesulfonic acid (PTS).
<Flowability Evaluation>

The molding sand produced in Examples and Comparative Examples and the binder shown in Table 1 were set in a 3-dimensional additive manufacturing device (trade name: S-Print, manufactured by ExOne). A sand mold was made by repeating formation of a molding sand layer by a recoater, and addition of the binder with a jet head in sequence. The molding sand layer each had a thickness of 0.28 mm. The length L (ref: FIG. 3) between the free end portion of the projection and the second wall in the recoater was, for the case of the molding sand of Examples 1 to 6 and Comparative Example 1 (artificial sand A), 1.0 mm, and for the case of the molding sand of Example 7 and Comparative Example 2 (artificial sand B), 1.4 mm.

Then, the formation of the molding sand layer and lamination were evaluated based on the criteria below. The results are shown in Table 2.

Good: molding sand layer was precisely formed, and molding sand layer was precisely laminated.

Fair: molding sand layer was partially disordered but there was no problem in sand mold making.

Bad: molding sand flowed out from recoater, molding sand could not be kept in recoater, and sand mold could not be made.
<Bending Strength Test>

Figure 8A:
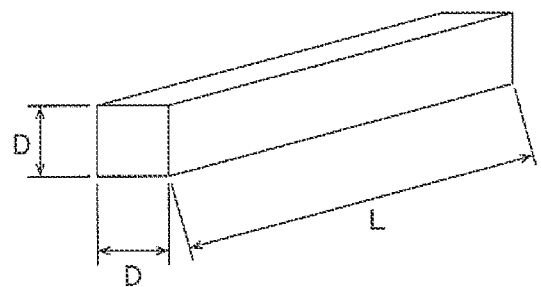
FIG. 8A is a perspective view of a test pillar used in the bending strength test in Examples and Comparative Examples.

Using the molding sand produced in Examples and Comparative Examples, in the same manner as in flowability evaluation, as shown in FIG. 8A, a test pillar of a regular prism having a side D of 22.4 mm and a length L of 147 mm was prepared.

The test pillar was allowed to stand at a room temperature of 24° C. and a humidity of 45% for the time shown in Table 2.

Figure 8B:
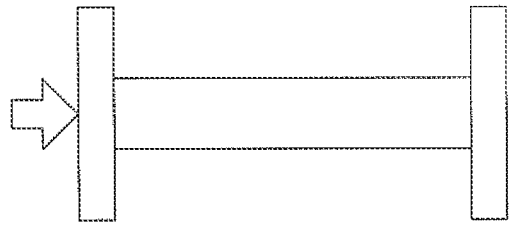
FIG. 8B shows the test pillar shown in FIG. 8A sandwiched by a test device.

Then, as shown in FIG. 8B, the test pillar was set in a test device (Universal Strength Machine PFG, manufactured by Simpson Technologies) so that the test pillar was sandwiched from outside in the length direction of the test pillar.

Then, an end of the test pillar was fixed, and a pressure was applied to the test pillar from the other side of the test pillar along the length direction of the test pillar. Then, the pressure at the time when the test pillar was broken was regarded as bending strength. The above-described bending strength test was repeated 3 to 5 times, and an average value of the bending strength by hours shown in Table 2 was calculated. The results are shown in Table 2.

TABLE 1

| Formulation (mass %) | Furan resin composition | Binder |
|---|---|---|
| Furfuryl alcohol | 40 | 90 |
| Urea-modified furan resin Prepolymer | 54 | — |
| Water | 5 | — |
| Silane | 1 | — |
| Resorcin | — | 10 |

TABLE 2

| | | | Example 1 | Example 2 | Example 3 | Example 4 | Example 5 | Example 6 | Example 7 | Comp. Ex. 1 | Comp. Ex. 2 |
|---|---|---|---|---|---|---|---|---|---|---|---|
| Formulation (mass %) | Artificial sand | A(EP) | 100 | 100 | 100 | 100 | 100 | 100 | — | 100 | — |
| | | B(CB) | — | — | — | — | — | — | 100 | — | 100 |
| | Furan resin composition | | | 0.25 | | | 0.15 | | 0.25 | 0.25 | 0.25 |
| | Curing agent | A(XS) | | 0.25 | | 0.05 | 0.15 | 0.25 | 0.25 | — | — |
| | | B(PTS) | — | — | — | — | — | — | — | 0.25 | 0.25 |
| | Xylene sulfonic acid/ furan resin precursor | | | 1.0 | | 0.3 | 1.0 | 1.7 | 1.0 | — | — |
| Mixing Temperature [° C.] | | | 35 | 70 | 90 | | | | 70 | | |
| Evaluation | Flowability | | Good | Good | Fair | Good | Good | Fair | Good | Bad | Bad |
| | Bending strength (kg/cm$^2$) | 1 h | 40.0 | 29.7 | 45.0 | 20.2 | 24.9 | 30.4 | 21.7 | | |
| | | 6 h | 47.9 | 35.2 | 47.8 | 25.3 | 31.1 | 25.6 | 23.2 | | |
| | | 24 h | 22.0 | 39.0 | 21.5 | 26.0 | 30.7 | 24.9 | 21.3 | | |

DESCRIPTION OF REFERENCE NUMERALS

1 molding sand
2 artificial sand
3 surface-modified layer

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The method for producing a molding sand of the present invention can be suitably used for production of a molding sand for producing sand mold that is used in production of various industrial products, in particular, for a molding sand for 3-dimensional additive manufacturing. The molding sand of the present invention can be suitably for a sand mold used for production of various industrial products, in particular, for a sand mold produced by 3-dimensional additive manufacturing.

The invention claimed is:

1. A method of producing a sand mold, the method comprising the steps of:
    mixing artificial sand with a furan resin composition including a furan resin precursor, whereby the furan resin composition covers surfaces of particles of the artificial sand,
    mixing a curing agent including xylene sulfonic acid with the artificial sand with which the furan resin composition is mixed,
    curing the furan resin composition with the curing agent, thereby preparing molding sand, and
    curing an added portion of a binder in the molding sand by adding the binder to the molding sand,
    wherein, in the step of preparing the molding sand, the curing agent cures the furan resin composition to form a resin cured product on the surfaces of the particles of the artificial sand, and the curing agent remains as an acid catalyst,
    the cured resin product forms a surface-modified layer,
    the remaining curing agent is attached to a surface of the surface-modified layer, and
    the molding sand includes the artificial sand, the surface-modified layer, and the curing agent,
    wherein, in the step of curing the added portion of the binder, the curing agent for curing the furan resin composition is used also as a curing agent for curing the binder.

2. The method of producing a sand mold according to claim 1, wherein
    in the step of mixing the artificial sand with the furan resin composition, the temperature is 100° C. or less.

3. The method of producing a sand mold according to claim 1, wherein
    0.3 parts by mass or more and 3 parts by mass or less of xylene sulfonic acid is mixed relative to 1 part by mass of the furan resin precursor.

* * * * *